Feb. 7, 1933.  S. M. ANDERSON  1,896,656
ASSEMBLY OF METAL SURFACES
Filed Sept. 10, 1930
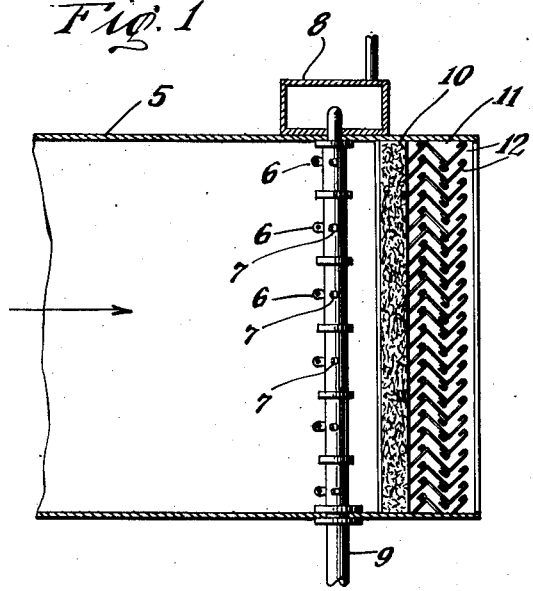
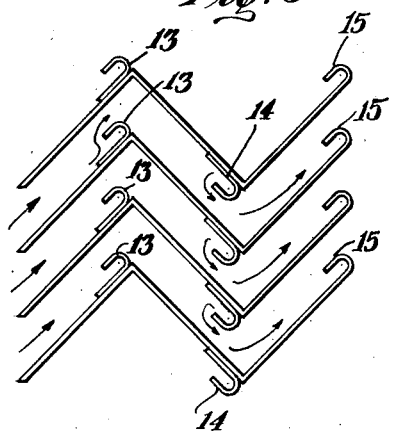
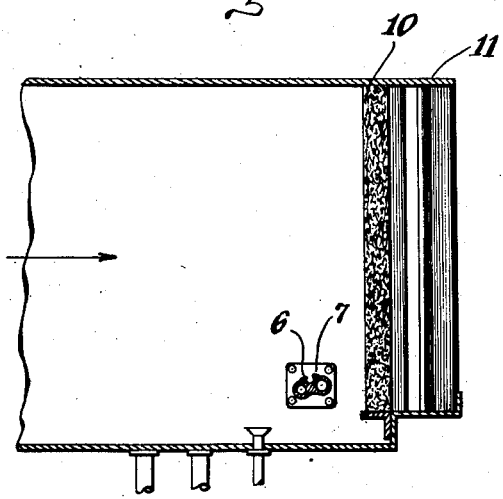
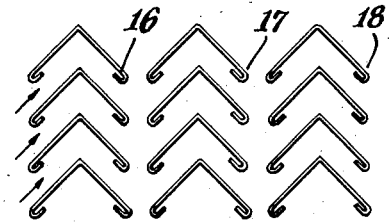
Inventor
SAMUEL M. ANDERSON
By his Attorney
Duell, Dunn & Anderson Patented Feb. 7, 1933

1,896,656

UNITED STATES PATENT OFFICE

SAMUEL M. ANDERSON, OF SHARON, MASSACHUSETTS, ASSIGNOR TO B. F. STURTEVANT COMPANY, OF BOSTON, MASSACHUSETTS, A COMPANY

ASSEMBLY OF METAL SURFACES

Application filed September 10, 1930. Serial No. 481,013.

This invention relates broadly to the welding of coated metals to other coated metals and relates more particularly to the preparation of separator baffles for air conditioning equipment.

An object of the invention is to provide a new method of welding coated metals to other coated metals.

Another object of the invention is to provide a more compact and a more efficient separator baffle for air conditioning systems.

Separator baffles are used in air conditioning systems and particularly in humidifying systems for removing an excess of entrained moisture from the conditioned air. In humidifying systems the purpose is to vaporize water so that it is supported by the air, but generally it is not desired that entrained moisture, that is, moisture in the form of unvaporized droplets, be carried by the air from the conditioning system into a room, since such droplets of water may be precipitated from the air upon the room furnishings, which is undesirable.

By using separator baffle plates in the exit ducts of air conditioning systems, the conditioned air is caused to assume a zigzag path outlined by the surfaces of the baffle plates so that any entrained moisture will be precipitated on the baffle plates by centripetal force and will be returned to a drainage sump.

The invention will now be described with reference to the drawing of which:

Fig. 1 is a partial plan view in section of a humidifier spray chamber illustrating the separator baffle plates of this invention;

Fig. 2 is a partial side view in section of the humidifier spray chamber shown by Fig. 1;

Fig. 3 is an enlarged view of the separator baffle plates of Fig. 1; and

Fig. 4 is a view illustrating the form of baffle plates now commonly employed.

The humidifier spray chamber shown by Figs. 1 and 2 comprises a sheet metal container 5 within which is supported a plurality of atomizers comprising the water nozzles 6 and the air nozzles 7. Water to the water nozzles is supplied from the tank 8 and air to the air nozzles is supplied through the pipe 9. In operation, compressed air is forced through the air nozzles 7 to produce a finely atomized spray at the mouth of the water nozzles 6. This spray is projected by the force of the compressed air into the spray chamber in a direction opposing the ventilating air, the direction of which is indicated by the arrows. In order to remove any entrained moisture from the air, there is provided the filter 10 which contains fine mesh galvanized wire. Some of the entrained moisture is removed by contact with the wires of the filter 10, but ordinarily a portion remains after the air passes through the filter. To remove the remaining entrained moisture, the separator baffle chamber 11 is provided. This chamber contains a large number of separator baffle plates 12, each baffle plate having three legs or members, the corresponding legs or members of one baffle plate being parallel to the corresponding members of each of the others. To obtain good drainage of the water collected by these baffles, they are usually placed with the line A—B in a vertical position as shown in Fig. 1 and Fig. 2. Referring to Fig. 3, note that on the upper surface of the first of the member of each complete baffle, adjacent the point of juncture with the second member, the fluid receiving hook 13 is provided. On the lower surface of the second of the member, adjacent the point of juncture with the third of the member, the hook 14 is provided. At the air delivery end of the third of the members, the hook 15 is provided.

Referring to Fig. 3, the air carrying the entrained moisture and entering the baffle chamber is indicated by the small arrows. The first of the hooks 13 contact with the air and a portion of the moisture is precipitated on the surfaces of the hooks. The air is then deflected and has its direction changed by the second of the members and then contacts with the hooks 14 where additional moisture is precipitated. The air has its direction again changed by the third of the members, and the hooks 15 in the path of the deflected air precipitate the remaining moisture in the air. With this arrangement there is a precipitating hook opposing the flow of air at each point of deflection. The air going around the first of the corners contacts with the hooks 13 and is then deflected around the corner adjacent the hook 13 and is again deflected around the second corner adjacent the hook 14. The water so collected then runs by gravity down the channel formed by the hooks to the drain tank. To illustrate the advantage of this arrangement, the common type of separator baffle plates will be explained and comparisons made.

Referring now to Fig. 4, the common type of baffle plates are shown. These baffle plates have twice the members and occupy approximately twice the space of the baffle plates employed in this invention. As the air indicated by the arrows enters the old type of baffle plates, it passes the first corner without being obstructed by any of the moisture precipitating hooks. It strikes the first hooks 16 after passing the first corner, the second hooks 17 after passing the third corner, and the third hooks 18 after passing the fifth corner. The number of hooks in a given space is the important thing, and by placing the hooks according to this invention right in the path of deflected air before and after passing each corner, the amount of space required for efficient baffle plates is halved. There is provided not only a more compact baffle, but a more efficient one, and one more easily and cheaply constructed with no materially increased air flow resistance.

In constructing the baffle plates according to this invention, the water precipitating hooks, made of galvanized iron, are spot welded to the members of the baffle plates which are made of galvanized iron. This spot welding has been found to melt the galvanizing and to mix the metal, leaving highly sensitive areas easily affected by rust and corrosion. In order that very durable baffle plates may be had, they, after the hooks have been spot welded to them, are placed in an acid bath which effectively removes grease and a portion of the old galvanizing metal. The plates are then placed in a new galvanizing bath. Each plate may be separately treated or the eliminator may be treated assembled. The acid bath does not remove all of the old galvanizing behind the welded hooks so that sufficient galvanizing remains between the hooks and the plates and around the spot welded points to act as a fluxing agent to aid in taking up of new galvanizing metal between the welded hooks and the baffle plates and around the spot welded points. Thus, those areas adjacent the hook which ordinarily would be the first to be susceptible to rust or oxidation are by this method made equally corrosion resistant with other portions of the baffle plates. Furthermore, by dipping the plates in the re-galvanizing bath after they have been cut and shaped, all cut edges and bends are coated completely with galvanizing, giving a truly protective coating over all surfaces with no cracks or flaking in the bends.

It is realized that the method above described is not limited to the welding of galvanized metals but applies equally as well to all coated or plated metals, the principles involved being the same in each case.

It is also realized that the invention is not limited to the construction of baffle plates for air conditioning equipment but covers in its scope all equipment where it may be desired to weld one coated metal to another coated metal.

Whereas one embodiment of the invention has been described for the purpose of illustration, it should be understood that the invention is not limited to the exact embodiment illustrated but only by the annexed claims.

What is claimed is:

1. The method of forming a separator baffle, which comprises bending a galvanized metal sheet to form a zigzagged outline, welding galvanized fluid restraining hooks to the straight sides of the bent sheet, placing the assembly in an acid bath to remove the surface of the galvanizing, and then regalvanizing same.

2. The method of forming a separate baffle, which comprises forming a zigzag outline from a continuous galvanized metal sheet, welding the galvanized fluid resisting hooks to the straight sides of the sheet, placing the assembly in an acid bath to remove the surface of the galvanizing, and then regalvanizing same.

In testimony whereof I affix my signature.

SAMUEL M. ANDERSON.